US008582905B2

(12) United States Patent
Walker et al.

(10) Patent No.: US 8,582,905 B2
(45) Date of Patent: Nov. 12, 2013

(54) METHODS AND SYSTEMS FOR RATE CONTROL WITHIN AN ENCODING DEVICE

(75) Inventors: Gordon Kent Walker, Poway, CA (US); Vijayalakshmi R. Raveendran, San Diego, CA (US); Binita Gupta, San Diego, CA (US); Phanikumar Bhamidipati, San Diego, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1026 days.

(21) Appl. No.: 11/669,000

(22) Filed: Jan. 30, 2007

(65) Prior Publication Data

US 2007/0204067 A1 Aug. 30, 2007

Related U.S. Application Data

(60) Provisional application No. 60/763,995, filed on Jan. 31, 2006.

(51) Int. Cl.
*G06K 9/36* (2006.01)

(52) U.S. Cl.
USPC ...................................... 382/239; 375/240.02

(58) Field of Classification Search
USPC ................ 709/246–257; 375/240.02–240.07; 382/232, 339, 239
See application file for complete search history.

(56) References Cited

U.S. PATENT DOCUMENTS

| 5,426,463 | A | * | 6/1995 | Reininger et al. ....... 375/240.03 |
| 5,764,632 | A | | 6/1998 | Ylitervo |
| 5,844,613 | A | | 12/1998 | Chaddha |
| 5,854,658 | A | | 12/1998 | Uz et al. |
| 6,038,256 | A | | 3/2000 | Linzer et al. |
| 6,185,253 | B1 | * | 2/2001 | Pauls ...................... 375/240.02 |
| 6,243,495 | B1 | | 6/2001 | Naveen et al. |
| 6,256,423 | B1 | * | 7/2001 | Krishnamurthy et al. .... 382/251 |

(Continued)

FOREIGN PATENT DOCUMENTS

| CN | 1492685 A | 4/2004 |
| CN | 1555612 A | 12/2004 |

(Continued)

OTHER PUBLICATIONS

"Two stage frame dropping for scalable video transmission over data networks" B Zheng, M Atiquzzaman—IEEE, 2001.*

(Continued)

*Primary Examiner* — Sean Motsinger
(74) *Attorney, Agent, or Firm* — Fulbright & Jaworski LLP

(57) ABSTRACT

This disclosure describes techniques for adjusting encoding variables of an encoding device. In response to a request to resize a segment of data, an encoding module adjusts at least one encoding variable used to encode one or more subsequent segments of data such that the subsequent segments of data are encoded at a bit rate that is different than the bit rate at which the subsequent segments of data would have been encoded had there been no request to resize. At some point, the encoding module re-adjusts the encoding variables used to encode the segments of data such that the subsequent segments of data are encoded to achieve a desired encoding result. For example, the encoding module may re-adjust the encoding variables after a period of time or may incrementally adjust the encoding variables until the encoding variables result in achieving the desired encoding result.

76 Claims, 6 Drawing Sheets

(56) References Cited

U.S. PATENT DOCUMENTS

| | | |
|---|---|---|
| 6,526,031 B1 | 2/2003 | Zaff et al. |
| 6,539,124 B2 | 3/2003 | Sethuraman et al. |
| 6,560,231 B1 | 5/2003 | Kawakami et al. |
| 6,574,279 B1 | 6/2003 | Vetro et al. |
| 6,674,796 B1 | 1/2004 | Haskell et al. |
| 6,704,281 B1 | 3/2004 | Hourunranta et al. |
| 6,744,743 B2 | 6/2004 | Walton et al. |
| 6,959,042 B1 | 10/2005 | Liu et al. |
| 7,023,915 B2 | 4/2006 | Pian et al. |
| 7,024,480 B2 | 4/2006 | Weik |
| 7,042,856 B2 | 5/2006 | Walton et al. |
| 7,095,754 B2 | 8/2006 | Benveniste |
| 7,180,905 B2 | 2/2007 | Benveniste |
| 7,245,605 B2 | 7/2007 | Benveniste |
| 7,248,600 B2 | 7/2007 | Benveniste |
| 7,272,181 B2 * | 9/2007 | Bayazit .................. 375/240.01 |
| 7,277,415 B2 | 10/2007 | Benveniste |
| 7,280,517 B2 | 10/2007 | Benveniste |
| 7,400,642 B2 | 7/2008 | Koo et al. |
| 7,406,202 B2 | 7/2008 | Kodama et al. |
| 7,415,241 B2 | 8/2008 | Oprescu-Surcobe et al. |
| 7,571,246 B2 * | 8/2009 | Virdi et al. .................... 709/232 |
| 7,623,458 B2 | 11/2009 | Ayyagari et al. |
| 7,653,085 B2 | 1/2010 | Dahl et al. |
| 7,659,907 B1 * | 2/2010 | Chalfin et al. ................ 345/555 |
| 7,835,437 B1 | 11/2010 | Zhang et al. |
| 7,876,821 B2 | 1/2011 | Li et al. |
| 2002/0056005 A1 | 5/2002 | Weik |
| 2002/0101832 A1 | 8/2002 | Chen et al. |
| 2002/0137535 A1 | 9/2002 | Hunzinger |
| 2002/0141357 A1 | 10/2002 | Park et al. |
| 2002/0142772 A1 | 10/2002 | Hunzinger |
| 2003/0040315 A1 | 2/2003 | Khaleghi et al. |
| 2003/0053416 A1 | 3/2003 | Ribas-Corbera et al. |
| 2003/0083093 A1 | 5/2003 | Yun et al. |
| 2003/0093515 A1 | 5/2003 | Kauffman |
| 2003/0112366 A1 * | 6/2003 | Baylon et al. .................. 348/441 |
| 2003/0123413 A1 | 7/2003 | Moon et al. |
| 2003/0185369 A1 | 10/2003 | Oliver et al. |
| 2004/0013102 A1 | 1/2004 | Fong et al. |
| 2004/0013103 A1 | 1/2004 | Zhang et al. |
| 2004/0028139 A1 * | 2/2004 | Zaccarin et al. ......... 375/240.24 |
| 2004/0042438 A1 | 3/2004 | Jiang et al. |
| 2004/0087331 A1 | 5/2004 | Hwang et al. |
| 2004/0114817 A1 | 6/2004 | Jayant et al. |
| 2004/0165783 A1 | 8/2004 | Reynolds et al. |
| 2004/0213466 A1 | 10/2004 | Kodama et al. |
| 2004/0220966 A1 | 11/2004 | Ridge |
| 2005/0058058 A1 | 3/2005 | Cho et al. |
| 2005/0063330 A1 | 3/2005 | Lee et al. |
| 2005/0078759 A1 | 4/2005 | Zhang |
| 2005/0110188 A1 | 5/2005 | Rausch et al. |
| 2005/0120128 A1 | 6/2005 | Willes et al. |
| 2005/0210515 A1 * | 9/2005 | Roh et al. ........................ 725/81 |
| 2005/0220188 A1 | 10/2005 | Wang |
| 2005/0223013 A1 | 10/2005 | Jarman et al. |
| 2005/0282571 A1 | 12/2005 | Oprescu-Surcobe et al. |
| 2005/0286631 A1 * | 12/2005 | Wu et al. .................. 375/240.12 |
| 2006/0013298 A1 * | 1/2006 | Tong et al. ............... 375/240.03 |
| 2006/0171460 A1 | 8/2006 | Masuda et al. |
| 2006/0262750 A1 | 11/2006 | Walton et al. |
| 2007/0076599 A1 | 4/2007 | Ayyagari et al. |
| 2007/0201388 A1 | 8/2007 | Shah et al. |
| 2007/0204067 A1 * | 8/2007 | Walker et al. ................ 709/247 |
| 2007/0274340 A1 | 11/2007 | Raveendran et al. |
| 2008/0037420 A1 | 2/2008 | Tang |
| 2008/0037624 A1 * | 2/2008 | Walker et al. ............ 375/240.01 |
| 2011/0299587 A1 | 12/2011 | Raveendran et al. |

FOREIGN PATENT DOCUMENTS

| | | |
|---|---|---|
| EP | 1014632 A2 | 6/2000 |
| EP | 1061522 | 12/2000 |
| EP | 1168731 | 1/2002 |
| EP | 1395039 | 3/2004 |
| EP | 1443511 | 4/2004 |
| JP | 8018976 A | 1/1996 |
| JP | 9233475 A | 9/1997 |
| JP | 10276439 A | 10/1998 |
| JP | 2000031964 | 1/2000 |
| JP | 2000092471 A | 3/2000 |
| JP | 2000324498 A | 11/2000 |
| JP | 2001136139 A | 5/2001 |
| JP | 2002010260 A | 1/2002 |
| JP | 2003046582 A | 2/2003 |
| JP | 2004248144 A | 9/2004 |
| JP | 2004349855 A | 12/2004 |
| JP | 2005167514 A | 6/2005 |
| JP | 2006014288 A | 1/2006 |
| KR | 1019990077445 A | 10/1999 |
| KR | 1020000049059 A | 7/2000 |
| WO | WO0008891 A1 | 2/2000 |
| WO | 0147283 | 6/2001 |
| WO | 0207447 | 1/2002 |
| WO | WO02082743 A2 | 10/2002 |
| WO | WO2004023743 A2 | 3/2004 |
| WO | WO2006099082 A2 | 9/2006 |
| WO | WO2006110876 A2 | 10/2006 |
| WO | 2007035238 A2 | 3/2007 |
| WO | WO2007090176 | 8/2007 |
| WO | WO2007090177 | 8/2007 |

OTHER PUBLICATIONS

ISR—PCT/US2007/061418; dated Mar. 8, 2007.
ISR—PCT/US2007/061419, dated Mar. 8, 2007.
Jia Zhike, et al., "Adaptive quantization scheme for very low bit rate video coding" Fifth Asia-Pacific Confernece on Communications and Fourth Optoelectronics and Communications Conference. APCC/OECC' 99; vol. 2, 1999, pp. 940-943.
Nakajima, T. et al. "Continuous media storage system supporting VBR streams." Real Time Computing Systems and Applications, 1996. Proceedings, 3rd International Workshop on Seoul, S. Korea. Oct. 30-Nov. 1, 1996. Los Alamitos, CA, IEEE Computer. Soc. US. Oct. 30, 1996, pp. 26-33.
ISR—PCT/US2007/061416, dated Dec. 12, 2007.
R. Thomas Derryberry et al, "Overview of CDMA2000, Revision D", May 28, 2002, XP-002311845.
3rd Generation Partnership Project (3GPP), "Physical Layer Standard for CDMA 2000 Spread Spectrum Systems", Doc. No. 3GPP2 C.S0002-C, Release C, Version 1.0, Dated May 28, 2002.
TIA-1099, Forward Link Only Air Interface Specification for Terrestrial Mobile Multimedia Multicast, Oct. 2006.
Written Opinion—PCT/US2007/061419—ISA/EPO—Aug. 3, 2007.
Taiwan Search Report—TW096103622—TIPO—Oct. 26, 2011.

* cited by examiner

METHODS AND SYSTEMS FOR RATE CONTROL WITHIN AN ENCODING DEVICE

This application claims the benefit of U.S. Provisional Application No. 60/763,995, filed Jan. 31, 2006 and entitled "MULTIMEDIA CONTENT RE/ENCODING AND STATISTICAL MULTIPLEXING," the entire content of each of which is incorporated herein by reference.

TECHNICAL FIELD

The disclosure relates to multimedia encoding and decoding and, more particularly, multimedia resizing for efficient statistical multiplexing.

BACKGROUND

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

Content delivery/media distribution systems may pack real time and non real time services into a transmission frame and deliver the frame to devices on a network. For example, a communication network may utilize Orthogonal Frequency Division Multiplexing (OFDM) to provide communications between a network server and one or more mobile devices. This technology provides a transmission frame having data slots that are packed with services to be delivered and transmitted over a distribution network.

SUMMARY

In general, this disclosure describes techniques for rate or quality control within an encoding device. More specifically, in response to a request to resize a segment of multimedia data, an encoding module resizes the segment of data to reduce the bit rate of the segment of data. The term "bit rate" as used herein, refers to the number of bits used per unit of time to represent the segment of multimedia data. Often bit rate is specified in kilobits per second (kbits/s). Thus, the bit rate of the segment of data corresponds to the size of the segment of data.

The encoding module may resize the segment of data to reduce the bit rate of the segment of data by adjusting one or more encoding variables. As one example, the encoding module may resize the segment of data by increasing the quantization parameter (QP) used to encode the segment of data. As another example, the encoding module may resize the segment of data by decreasing the frame rate, i.e., dropping more frames. The encoding module may also reduce the bit rate of the segment of data, and thus the size, by adjusting other encoding variables.

Additionally, the encoding module adjusts at least one encoding variable used to encode one or more subsequent segments of data such that the subsequent segments of data are encoded at a bit rate that is different than the bit rate at which the subsequent segment of data would have been encoded had there been no re-encode request received for the previous segment of data. For example, the encoding module may adjust the bit rate at which to encode the subsequent segment of data to a bit rate that is less than the bit rate at which the subsequent segment of data would have been encoded had there been no resize request received for the previous segment of data. In this manner, the encoding module attempts to encode one or more subsequent segments of data at a bit rate that allows the segments to fit efficiently within the corresponding transmission frame without receiving a resize request for the subsequent segment of data.

At some point, the encoding module readjusts the encoding variable used to encode the subsequent segments of data such that the subsequent segments of data are encoded at a desired encoding result. In other words, the encoding module re-adjusts the encoding variable such that the encoding module encodes the subsequent segments of data as if no resize request was received for the previous segment of data. For example, the encoding module may re-adjust the encoding variable to encode the subsequent segments of data at a desired bit rate, a desired quality level, a desired frame rate, or the like. In one aspect of this disclosure, the encoding module may re-adjust the encoding variable when no resize requests have been received for a period of time. Alternatively, the encoding module may incrementally adjust the encoding variable used to encode the subsequent segments of data until the subsequent segments of data are encoded at a desired encoding result. If a resize request is received for one of the subsequent segments of data, however, the encoding module may again adjust one or more encoding variables used to encode the subsequent segments of data.

In one aspect, a method for encoding streams of multimedia data comprises receiving a request to resize a segment of data associated with the stream of digital multimedia data, resizing the segment of data in response to the request and adjusting at least one encoding variable used to encode one or more subsequent segments of data such that the subsequent segments of data are encoded at a bit rate that is different than the bit rate at which the subsequent segments of data would have been encoded had there been no request to resize.

In another aspect, an apparatus for encoding a stream of digital multimedia data comprises a resizing module that receives a request to resize a current segment of data associated with the stream of digital multimedia data and resizes the segment of data in response to the request and a rate control module that adjusts at least one encoding variable used to encode one or more subsequent segments of data such that the subsequent segments of data are encoded at a bit rate that is different than the bit rate at which the subsequent segments of data would have been encoded had there been no request to resize.

In a further aspect, an apparatus for encoding a stream of digital multimedia data comprises means for receiving a request to resize a segment of data associated with the stream of digital multimedia data, means for resizing the segment of data in response to the request, and means for adjusting at least one encoding variable used to encode one or more subsequent segments of data such that the subsequent segments of data are encoded at a bit rate that is different than the bit rate at which the subsequent segments of data would have been encoded had there been no request to resize.

In another aspect, a processor for processing digital video data is adapted to receive a request to resize a segment of data associated with the stream of digital multimedia data, resize the segment of data in response to the request, and adjust at least one encoding variable used to encode one or more subsequent segments of data such that the subsequent segments of data are encoded at a bit rate that is different than the bit rate at which the subsequent segments of data would have been encoded had there been no request to resize.

The techniques described herein may be implemented in hardware, software, firmware, or any combination thereof. If implemented in software, the techniques may be realized in whole or in part by a computer readable medium comprising instructions that, when executed by a processor, performs one or more of the methods described herein. Accordingly, this disclosure also contemplates a computer-program product for processing digital video data that comprises a computer readable medium comprising instructions that cause at least one computer to receive a request to resize a segment of data associated with the stream of digital multimedia data, resize the segment of data in response to the request, and adjust at least one encoding variable used to encode one or more subsequent segments of data such that the subsequent segments of data are encoded at a bit rate that is different than the bit rate at which the subsequent segments of data would have been encoded had there been no request to resize.

The details of one or more aspects are set forth in the accompanying drawings and the description below. Other features, objects, and advantages of this disclosure will be apparent from the description and drawings, and from the claims.

DETAILED DESCRIPTION

Figure 1:
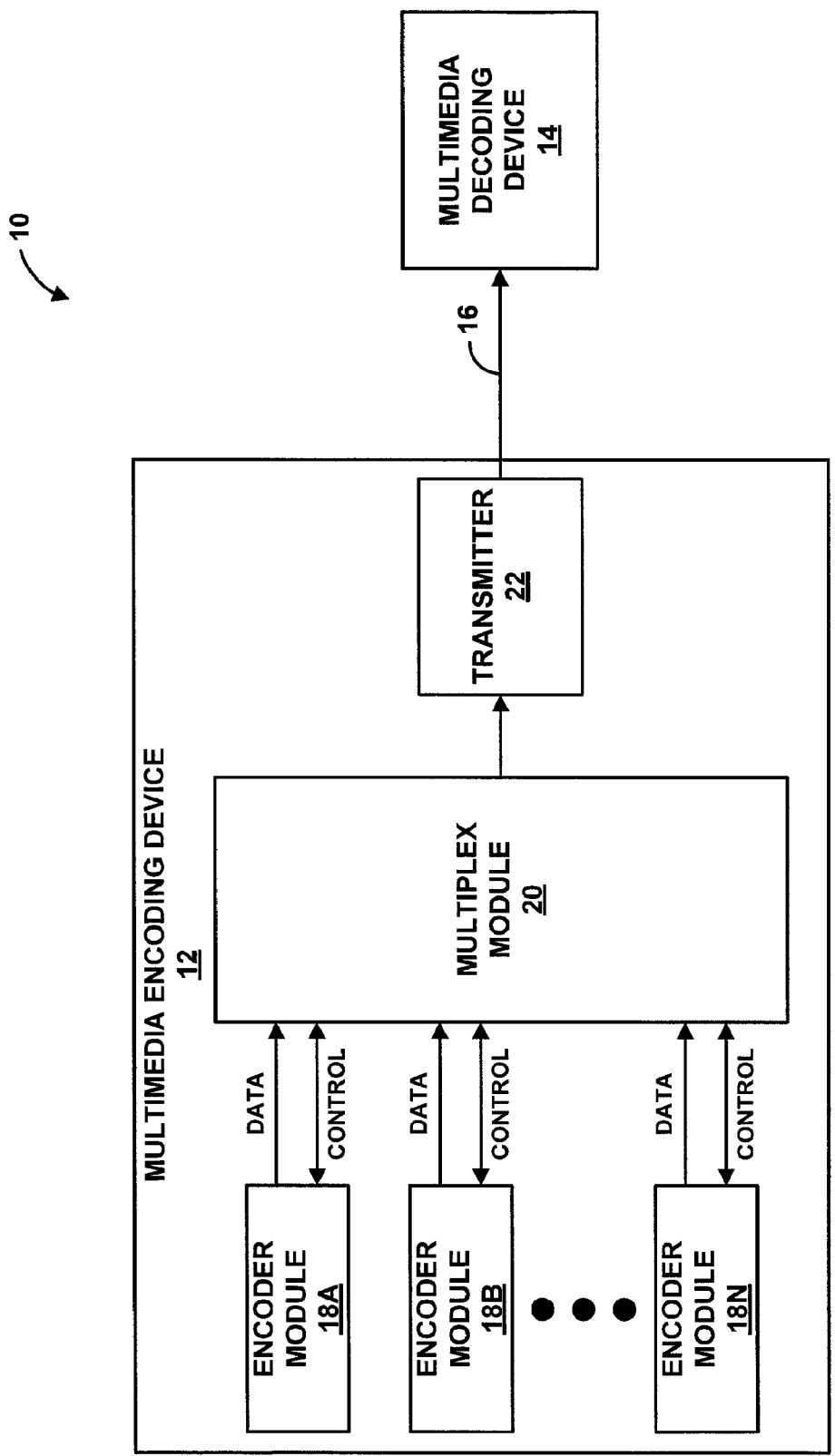
FIG. 1 is a block diagram illustrating an exemplary encoding and decoding system.

In general, this disclosure describes techniques for rate or quality control within an encoding device. More specifically, in response to a request to resize a segment of multimedia data, an encoding module resizes the segment of data to reduce the bit rate of the segment of data. The term "bit rate" as used herein, refers to the number of bits used per unit of time to represent the segment of multimedia data. Often bit rate is specified in kilobits per second (kbits/s). Thus, the bit rate of the segment of data corresponds to the size of the segment of data.

The encoding module may resize the segment of data to reduce the bit rate of the segment of data by adjusting one or more encoding variables. As one example, the encoding module may resize the segment of data by increasing the quantization parameter (QP) used to encode the segment of data. As another example, the encoding module may resize the segment of data by decreasing the frame rate, i.e., dropping more frames. The encoding module may also reduce the bit rate of the segment of data, and thus the size, by adjusting other encoding variables.

Additionally, the encoding module adjusts at least one encoding variable used to encode one or more subsequent segments of data such that the subsequent segments of data are encoded at a bit rate that is different than the bit rate at which the subsequent segment of data would have been encoded had there been no re-encode request received for the previous segment of data. For example, the encoding module may adjust the bit rate at which to encode the subsequent segment of data to a bit rate that is less than the bit rate at which the subsequent segment of data would have been encoded had there been no resize request received for the previous segment of data. In this manner, the encoding module attempts to encode one or more subsequent segments of data at a bit rate that allows the segments to fit efficiently within the corresponding transmission frame without receiving a resize request for the subsequent segment of data.

At some point, the encoding module readjusts the encoding variable used to encode the subsequent segments of data such that the subsequent segments of data are encoded at a desired encoding result. In other words, the encoding module re-adjusts the encoding variable such that the encoding module encodes the subsequent segments of data as if no resize request was received for the previous segment of data. For example, the encoding module may re-adjust the encoding variable to encode the subsequent segments of data at a desired bit rate, a desired quality level, a desired frame rate, or the like. In one aspect of this disclosure, the encoding module may re-adjust the encoding variable when no resize requests have been received for a period of time. Alternatively, the encoding module may incrementally adjust the encoding variable used to encode the subsequent segments of data until the subsequent segments of data are encoded at a desired encoding result. If a resize request is received for one of the subsequent segments of data, however, the encoding module may again adjust one or more encoding variables used to encode the subsequent segments of data.

FIG. 1 is a block diagram illustrating an exemplary encoding and decoding system 10. Encoding and decoding system 10 includes a multimedia encoding device 12 and a multimedia decoding device 14. Multimedia encoding device 12 encodes multimedia data, combines the encoded data and transmits the combined data to multimedia decoding device 14 via a transmission channel 16. Multimedia encoding device 12 may form part of a broadcast network component used to broadcast one or more channels of multimedia data. Multimedia encoding device 12 may, for example, form part of a wireless base station, server, or any infrastructure node that is used to broadcast one or more channels of encoded multimedia data to one or more wireless devices, such as multimedia decoding device 14.

Multimedia encoding device 12 may encode a plurality of services that include one or more flows of multimedia data, combine the encoded flows and transmit the combined flows to a multimedia decoding device via a transmission channel 16. The services may include multimedia content or service such as news, sports, weather, financial information, movies, and/or applications, programs, scripts, or any other type of suitable content or service. In one aspect of this disclosure, multimedia encoding device 12 encodes, combines, and transmits portions of the flows of data received over a period of time. As an example, multimedia encoding device 12 may operate on the flows on a per second basis. In other words, multimedia encoding device 12 encodes one-second segments of data of the plurality of flows, combines the one-second segments of data to form a superframe of data, and transmits the superframe over transmission channel 16 via a transmitter 22. As used herein, the term "superframe" refers to a group of segments of data collected over a time period or window, such as a one second time period or window. The segments of data may include one or more frames of data. Although the techniques of this disclosure are described in the context of one-second segments of data, the techniques may also be utilized for combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals.

Multimedia decoding device 14 may comprise a user-device that receives the encoded multimedia data transmitted by multimedia encoding device 12. By way of example, decoding device 14 may be implemented as part of a digital television, a wireless communication device, a portable digital assistant (PDA), a laptop computer or desktop computer, a digital music and video device, such as those sold under the trademark "iPod," or a radiotelephone such as cellular, satellite or terrestrial-based radiotelephone. Although only a single multimedia decoding device 14 is illustrated in FIG. 1 for simplicity, multimedia encoding device 12 may transmit the combined flows of data to more than one multimedia decoding device.

Transmission channel 16 may comprise any wired or wireless medium, or combination thereof. In one aspect, transmission channel 16 is a fixed bandwidth channel. In other words, the amount of transmission channel resources available for transmitting the combined flows of data is limited. In the wireless context, the transmission channel resources may comprise air-link or air-interface resources. Thus, the number of bits of data that multimedia encoding device 12 may transmit via transmission channel 16 is limited by the amount of transmission channel resources available for transmission. Transmission channel 16 may comprise one or more radio access technologies, such as Global System for Mobile Communications (GSM), code division multiple access (CMDA), CDMA 2000, wideband CDMA (W-CDMA), CDMA 1x Evolution-Data Optimized (EV-DO), frequency division multiple access (FDMA), time division multiple access (TDMA) or the broad family of standards developed to facilitate wireless networking defined by the various IEEE 801.11x standards.

Multimedia encoding device 12 may attempt to output each of the flows of data at a constant quality level or a constant bit rate. The techniques described herein are applicable in either context. In the case of trying to maintain a constant quality, for example, multimedia encoding device 12 selects a bit rate for the flows of data based on a target quality level. The target quality level used to determine the bit rate can be pre-selected, selected by a user, selected through an automatic process or a semi-automatic process requiring an input from a user or from another process, or selected dynamically by the encoding device or system based on predetermined criteria. A target quality level can be selected based on, for example, the type of encoding application, or the type of client device that would be receiving the multimedia data. If the number of bits necessary to output each of the flows of data at the target quality level exceeds the amount of bits for which there is available transmission channel resources for transmission over transmission channel 16, multimedia encoding device 12 manages bit allocation among the flows in an attempt to preserve the highest overall quality for the plurality of flows.

As shown in FIG. 1, multimedia encoding device 12 includes encoder modules 18A-18N (collectively, "encoder modules 18"), a multiplex module 20 and a transmitter 22. Encoder modules 18 receive flows of digital multimedia data from one or more sources. Encoder modules 18 may, for example, receive the flows of multimedia data from a memory or an image capture device coupled to encoder modules 18.

The flows of multimedia data may comprise live real-time video, audio, or video and audio flows to be coded and transmitted as a broadcast or on-demand, or may comprise pre-recorded and stored video, audio, or video and audio flows to be coded and transmitted as a broadcast or on-demand. The techniques of this disclosure may also be applied to non-real time services or a combination of real-time services and non-real time services. For purposes of illustration, however, this disclosure describes use of the encoding techniques on real-time services.

Encoder modules 18 send delivery requirements associated with the segments of data to multiplex module 20. Encoder modules 18 may, for example, send the quality and rate information associated with real-time services to multiplex module 20 via one or more control channels. Additionally, encoder modules 18 may send priority and latency requirements associated with non-real time services. Multiplex module 20 and encoder modules 18 may communicate over the control channels using a number of different communication protocols. In one aspect, multiplex modules 20 may communicate using protocols that utilize the message transport layer (MTL) as the underlying transport mechanism.

Multiplex module 20 analyzes the delivery requirements, e.g., the quality and rate information, priority requirements, and latency requirements, to determine whether there are sufficient transmission channel resources to transmit the segments of data that encoder modules 18 desire to include in the current superframe 16. Multiplex module 20 may, for example, determine an amount of transmission channel resources necessary to send each of the segments of data at the sizes and/or bit rates corresponding to a selected one of the quality levels, sum the amounts of transmission channel resources necessary to send the segments of data and compare the sum total of transmission channel resources required by all the segments of data with an amount of available transmission channel resources to determine whether there is sufficient transmission channel resources to send the segments of data.

If multiplex module 20 determines that the plurality of segments of data do not fit within the available bandwidth, e.g., the sum total of necessary transmission channel resources exceeds the available transmission channel resources, multiplex module 20 selects one or more of the segments to be resized. Multiplex module 20 may attempt to select the segments of data to be resized that have a least amount of impact in quality at the corresponding reduced size. Multiplex module 20 sends a request to encoder modules 18 associated with the selected segments of data to resize the flows of digital multimedia data in accordance with the reduced bit allocation or reduced bit rate. The resize request may specify a maximum size, e.g., in bits, for the selected segment of data or a reduced bit rate for the segment of data.

Encoder modules 18 associated with the selected segments of data receive the resize requests associated with their respective segments of data, and resize the segments of multimedia data. Encoder modules 18 may reduce the bit rate of the segment of data in a number of different ways. In particular, encoder modules 18 associated with the selected segments of data adjust one or more encoding variables to reduce the size of the segments of data. For example, encoder modules 18 associated with the selected segments of data may reduce the bit rate of the segment of data by re-encoding the segments of data at a higher QP, decreasing the frame rate, i.e., dropping additional frames of data to be encoded, or adjusting some other encoding variable. As described above, encoder modules 18 associated with the selected segments of data may resize the segments of data by reducing the bit rate to a reduced bit rate or size specified in the resize request. Alternatively, encoder modules 18 may determine the reduced bit rate or size at which to re-encode the segment of data. Alternatively or additionally, encoder modules 18 associated with the selected segments of data may reduce the amount of information that is to be encoded, thus reducing the size of the segments of data. In this manner, encoder modules 18 associated with the selected segments of data resize the segments of data to satisfy the size or bit rate requirements specified in the resize requests.

Multiplex module 20 collects the encoded segments of data when multiplex module 20 is ready to generate the current superframe. Multiplex module 20 may, for example, send transfer requests to encoder modules 18 via the control channel. In response to the requests, encoder modules 18 send the encoded segments of multimedia data to multiplex module 20. Multiplex module 20 combines the flows of multimedia data to form a superframe and sends the superframe to transmitter 22 for transmission to one or more decoding devices via transmission channel 16. In this manner, multiplex module 20 manages bit allocation among the flows to fit all the segments of data into the fixed bandwidth channel 16 while preserving the highest overall quality of the plurality of flows of data.

As will be described in detail herein, encoder modules 18 associated with the selected segments of data may adjust one or more encoding variables used to encode one or more subsequent segments of data, e.g., a next segment of data, such that the subsequent segment of data is encoded at a bit rate that is different than the bit rate at which the subsequent segment of data would have been encoded had there been no re-encode request received for the previous segment of data. Encoder modules 18 may, for example, adjust a QP, a frame rate or the like to achieve the different bit rate. In one aspect, encoder modules 18 associated with the selected segments of data may adjust the one or more encoding variables to achieve the reduced bit rate used to resize the selected segment of data. Encoder modules 18 may adjust the encoding variables to reduce the bit rate to be used for encoding subsequent segments of data after receiving a single resize request. Alternatively, encoder modules 18 may adjust the encoding variables to reduce the bit rate for subsequent segments of data after receiving resize requests for a number of consecutive segments of data.

As described above, encoder modules 18 may attempt to output each of the flows of data at a constant quality level or a constant bit rate. For ones of encoder modules 18 that attempt to encode at a constant bit rate, the encoder modules 18 may adjust the encoding variables to reduce the bit rate below the target bit rate. Similarly, for ones of encoding modules 18 that attempt to encode at a constant quality level, encoder modules 18 adjust the encoding variable to reduce the bit rate below the bit rate required to achieve the target quality level. In this manner, the encoding module attempts to ensure that the subsequent segments of data encoded at the different bit rate will fit within the corresponding transmission frame without receiving a resize request for the subsequent segment of data.

At some point, encoder modules 18 readjust the encoding variable used to encode the subsequent segments of data such that the subsequent segments of data are encoded at a desired encoding result (e.g., quality level, bit rate, frame rate, frame size, aspect ratio, QP, SNR, PSNR, structural similarity, mean opinion scores, and other such objective and subjective variables and paramaters). In other words, encoder modules 18 re-adjust the encoding variable such that encoder modules 18 encode the subsequent segments of data as if no resize request was received for the previous segment of data. In one aspect of this disclosure, encoder modules 18 may re-adjust the encoding variable when no resize requests have been received for a period of time. In other words, encoder modules 18 return the adjusted encoding variable back to a desired value after the period of time expires. Alternatively, encoder modules may incrementally adjust the encoding variable used to encode the subsequent segments of data until the subsequent segments of data are encoded at a desired encoding result. If a resize request is received for one of the subsequent segments of data, encoder modules 18 may again reduce the bit rate for the subsequent segments and begin the process all over again.

The components in multimedia encoding device 12 are exemplary of those applicable to implement the techniques described herein. Multimedia encoding device 12, however, may include many other components, if desired. Moreover, the techniques of this disclosure are not necessarily limited to use in a system like that of FIG. 1, nor a broadcast system. The techniques may find application in any multimedia encoding environment in which encoding techniques are used to encode a plurality of flows of multimedia data for transmission over a transmission channel with limited bandwidth. The illustrated components of multimedia encoding device 12 may be integrated as part of an encoder/decoder (CODEC).

The components in multimedia encoding device 12 may be implemented as one or more processors, digital signal processors, application specific integrated circuits (ASICs), field programmable gate arrays (FPGAs), discrete logic, software, hardware, firmware, or any combinations thereof. Moreover, multimedia encoding device 12 may comply with a multimedia coding standard such as Moving Picture Experts Group (MPEG-4), one or more of the standards developed by International Telecommunication Union Standardization Sector (ITU-T), e.g., H.263 or H.264, or other coding standard, or a combination thereof. Depiction of different features as modules is intended to highlight different functional aspects of multimedia encoding device 12 and does not necessarily imply that such modules must be realized by separate hardware or software components. Rather, functionality associated with one or more modules may be integrated within common or separate hardware or software components. Thus, the disclosure should not be limited to the example of multimedia encoding device 12.

Figure 2:
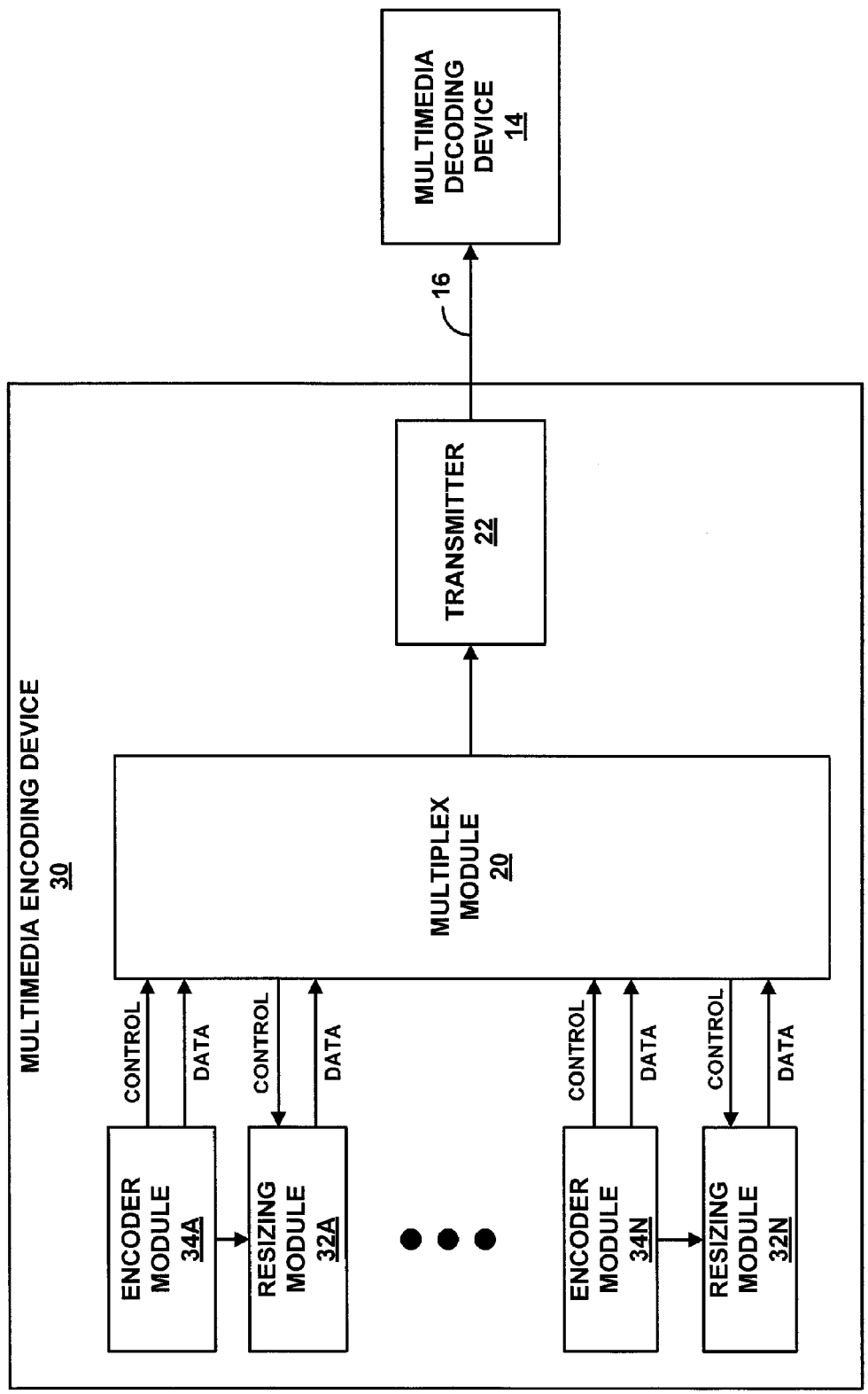
FIG. 2 is a block diagram illustrating another exemplary encoding and decoding system.

FIG. 2 is a block diagram illustrating another exemplary encoding and decoding system 30. Encoding and decoding system 30 conforms substantially to encoding and decoding system 10 of FIG. 1, but the resizing of selected segments of multimedia data is performed by resizing modules 32A-32N (collectively, "resizing modules 32") associated with the selected segments of data. Thus, the functionality of encoder modules 18 of FIG. 1 is divided between encoder modules 34A-34N (collectively, "encoder modules 34") and resizing modules 32. In other words, encoder modules 34 provide multiplex module 20 with delivery requirements, such as quality and rate information, priority requirements, latency requirements and the like, associated with each of the segments of data for use in allocating the available bandwidth to the segments of data and selecting one or more of the segments of data to be resized when the allocation fails.

Resizing modules 32 receive requests from multiplex module 20 to resize the segments of data and resize the segments of data in accordance with the requirements specified by multiplex module 20 in the resize request. Additionally, resizing modules 32 may provide encoder modules 34 with the bit rate at which the segments of data were re-encoded to allow encoder modules 34 to set the bit rate for subsequent segments of data to the reduced bit rate used to re-encode the selected segment of data. In accordance with the techniques of this disclosure, encoder modules 34 may continue to encode subsequent segments of data at the reduced bit rate, i.e., using the adjusted encoding variables, for a period of time and then return the original values of the encoding variables or gradually increase the values of the encoding variables used to encode the subsequent segments of data until the values of the encoding variables reach a desired value.

Figure 3:
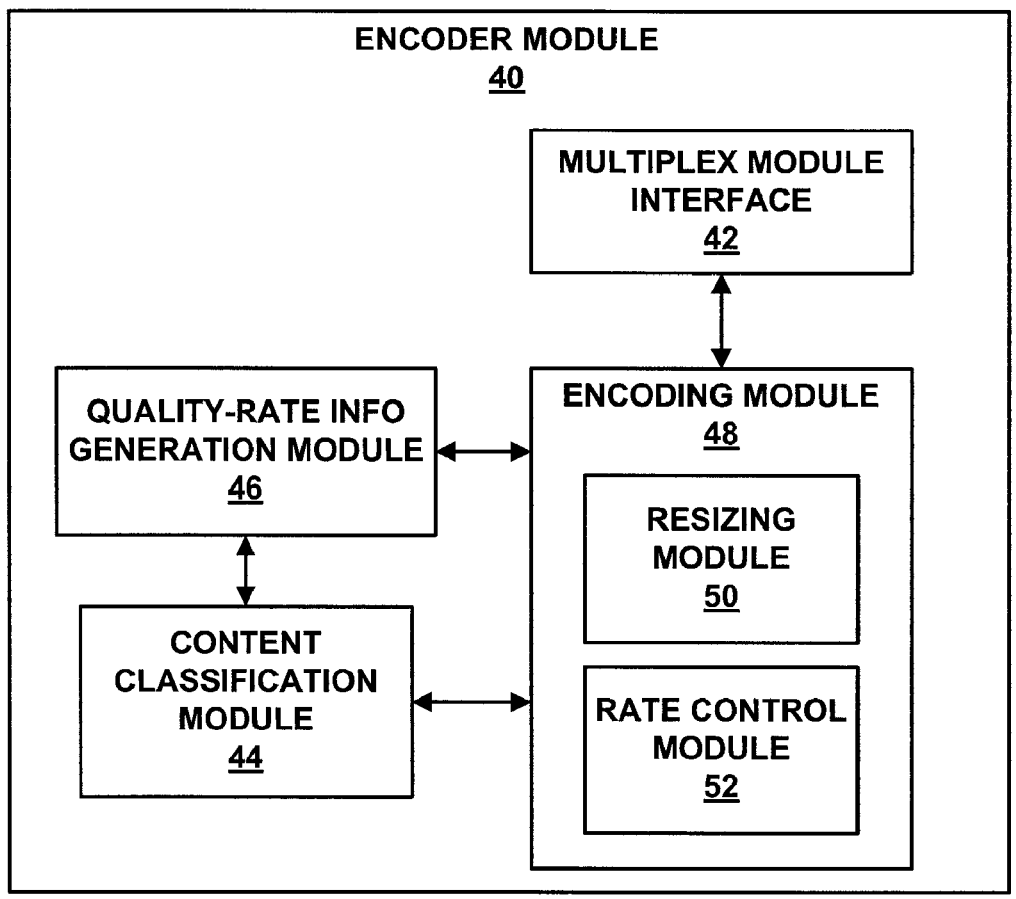
FIG. 3 is a block diagram illustrating an exemplary encoder module for use within a multimedia encoding device.

FIG. 3 is a block diagram illustrating an exemplary encoder module 40 for use within a multimedia encoding device, such as multimedia encoding device 12 of FIG. 1. Encoder module 40 may, for example, represent any one of encoder modules 18 of encoding device 12 of FIG. 1. Encoder module 40 includes a multiplex module interface 42, a content classification module 44, quality-rate information generation module 46, and an encoding module 48. Encoding module 48 further includes a resizing module 50 that resizes segments of data selected for resizing. Additionally, encoding module 48 includes a rate control module 52 that controls the bit rate of encoder module 40 in accordance with the techniques of this disclosure.

Encoder module 40 receives one or more flows of multimedia data from a source. Encoder module 40 may, for example, receive the flows of multimedia data from a memory or an image capture device coupled to encoder module 40. The flows of multimedia data may comprise live real-time video, audio, or video and audio flows to be coded and transmitted as a broadcast, or may comprise a pre-recorded and stored video, audio, or video and audio flows to be coded and transmitted as a broadcast or on-demand. The techniques of this disclosure may also be applied to non-real time services or a combination of real-time services and non-real time services.

Encoder module 40 may be configured to operate at a constant bit rate or quality level. For example, encoder module 40 may attempt to maintain a constant perceived quality metric for the flows of data regardless of the content of the data. In other words, encoder module 40 may attempt to output every flow of data at a target quality level. To maintain a constant or similar perceived quality level, encoder module 40 may select different bit rates for segments of data with different content. To this end, content classification module 44 classifies the segments of data based on their content. Content classification module 44 may classify the segment of data based on the complexity (e.g., spatial complexity and/or temporal complexity) of the data of the segment. One exemplary content classification method is described in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein by reference. For example, content classification module 44 may classify motion information, e.g., motion vectors, into categories of "high," "medium," and "low" (on an x-axis) and classify texture information, e.g., contrast ration values, into categories of "high," "medium," and "low," (on a y-axis) and the content classification is indicated at the point of intersection. This classification may be associated, for example, with a particular quality-rate curve.

Content classification module 44 associates the segments of data with quality and rate information or other delivery requirements based on the classifications. Content classification module 44 may, for example, associate the segments of data with respective quality-rate curves. The quality-rate curves model a quality metric, such as peak signal to noise ratio (PSNR), as a function of a bit rate. Encoder module 40 may be configured with quality-rate curves that have been computed offline. Alternatively, quality-rate information generation module 46 may generate the quality-rate curves by, for example, modeling the quality-rate curves using a logarithmic function of the form:

$$Q=a*\ln(r)+b,$$

where Q is the quality metric, r is the bit rate, and a and b are constants computed using a number of sample data points. Quality-rate information generation module 46 may maintain a plurality of quality-rate curves that represent quality-rate characteristics for flows of data with varying content. As an example, quality-rate information generation module 46 may maintain quality-rate curves for eight different classes associated with varying levels of motion and texture in the content of the flows. To account for the fact that constant PSNR does not necessarily mean constant perceived quality, quality-rate information generation module 46 may maintain quality-rate curves that use a quality metric other than PSNR, such as mean opinion scores (MOS). Alternatively, quality-rate information generation module 46 may adjust the quality-rate curves to account for the fact that constant PSNR does not necessarily mean constant perceived quality. For example, quality-rate information generation module 46 may adjust traditional quality-rate curves by an offset as described in detail in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein be reference.

Alternatively, quality-rate information generation module 46 may adjust the target quality level associated with each of the content curves by an offset. Segments of data that include high motion, high texture content may, for example, be encoded at a slightly lower quality with respect to the target quality level, whereas segments of data that include low motion, low texture content may be encoded at slightly higher quality with respect to the target quality level. Because each content class has its own adjusted quality level relative to the overall target quality level, encoder module 40 may normalize the quality level for each content class to measure the current quality level at encoder module 40. Encoder module 40 may achieve this normalization according to the linear equation below:

$$Q_{norm}=Q_r-Q_k,$$

where $Q_{norm}$, is the normalized quality level, $Q_r$ is the recorded quality level, and $Q_k$ is the adjustment offset in quality level for curve k. If quality normalization is not a linear function, rank determination may be performed after quality normalization.

In another example, content classification module 44 may associate the segments of data with pre-computed quality-rate tables that indicate one or more quality levels associated with the segments and sizes of the segment at each of the quality levels. To do so, content classification module 44 may associate the segment of data with a quality-rate curve, which corresponds to a particular one of the quality-rate tables. Quality-rate information generation module 46 may pre-compute the quality-rate curves, the adjusted quality-rate curves, or quality-rate tables, and store the pre-computed quality and rate information within a memory (not shown). Content classification module 44 may access the pre-computed quality and rate information when needed. Alternatively, quality-rate information generation module 46 may generate quality and rate information for the segments of data in real-time. For example, quality-rate information generation module 46 may create quality-rate tables based on the quality-rate curve associated with the segment of data.

Encoder module 40 sends the quality and rate information associated with each of the segments of data to be included within the current superframe to multiplex module 20 (FIG. 1) via multiplex module interface 42. The quality and rate information assists multiplex module 20 in monitoring the size of the current superframe and determining which of the segments of data to resize, if resizing is required to fit the segments of data within the current superframe. Encoder module 40 may send the quality and rate information to multiplex module 20 in response to a request from multiplex module 20. As described above, the quality and rate information may comprise a quality-rate curve or quality-rate table associated with the segment of data.

If any of the segments of data associated with encoder module 40 need to be resized, multiplex module 20 sends a resize request to encoder module 40. In response to the resize request, resizing module 50 resizes the segment of multimedia data to reduce the size of the segment of data. In particular, resizing module 50 adjusts one or more encoding variables to reduce the bit rate, and thus size, of the selected segment of data. For example, resizing module 50 may increase a quantization value, reduce an encoding rate, decrease a frame rate at which the segments of data are encoded, or adjust another encoder variable that affects the bit rate or size of the segment of data. In some cases, the reduced bit rate may be specified within the resize request. Alternatively, rate control module 52 may select a reduced bit rate based on other information, such as a maximum size, specified in the resize request.

In some cases, resizing of the segment of data may cause the quality level of the segment of data to fall below the target quality level. However, as described above, multiplex module 20 selects the segments to be re-encoded such that the overall quality of all the segments of data is preserved. If the quality level of the resized segment of data falls below a minimum quality level associated with encoder module 40, resizing module 50 may resize the segment of data such that the quality level of the resized segment of data is greater than or equal to the minimum quality level. For example, if a bit rate included within the resize request results in the segment of data being encoded at a quality level below the minimum quality level associated with encoder module 40, rate control module 52 may select a higher bit rate that results in the segment of data being encoded at the minimum quality level.

Encoder module 40 receives a request from multiplex module 20 to send the encoded segments of data to be included within the current superframe. In response to the request from multiplex module 20, encoder module 40 sends the encoded segments of data to multiplex module 20. As described above, encoder module 40 sends the segments of data that were not selected for resizing at the original bit rate and sends the segments of data that were selected for resizing at the reduced bit rate.

Rate control module 52 may adjust one or more encoding variables used to encode subsequent segments of data such that the subsequent segments of data are encoded at a bit rate that is different than the bit rate at which the subsequent segment of data would have been encoded had there been no re-encode request received for the previous segment of data. Rate control module 52 may, for example, reduce a bit rate at which the subsequent segments of data are encoded. As another example, rate control module 52 may adjust another encoding variable that affects the bit rate at which the subsequent segment of data is encoded, e.g., a QP value or a frame rate. Rate control module 52 may adjust encoding variables of encoding module 48 to be equal to the encoding variables used to re-encode the previous segment of data. In one example, rate control module 52 may set the bit rate of encoding module 48 equal to the reduced bit rate specified in the resize request received for the previous segment of data.

As described above, encoding module 48 returns the encoding variables to their normal values at some point to encode subsequent segments of data as if no resize request was received for the previous segment of data. In one aspect of this disclosure, encoding module 48 may continue to encode subsequent segments of data using the adjusted encoding variables for a period of time and then re-adjust the encoding variables to values necessary to encode the segments of data at a desired encoding result, e.g., at target quality level or a target bit rate. For example, encoding module 48 may continue to encode subsequent segments of data using the adjusted encoding variables until expiration of a timer at which time encoding module 48 re-adjusts the encoding variables to encode the segments of data at desired encoding result, e.g., target quality level. In another example, encoding module 48 may continue encoding subsequent segments of data using the adjusted encoding variables until a counter that tracks the number of subsequent segments of data that have been sent without receiving a resize request exceeds a threshold. If encoding module 48 receives a request to resize one of the subsequent segments of data before expiration of the timer or before the counter exceeds the threshold, encoding module 48 resets the timer or the counter, thus restarting the period of time during which encoding module 48 encodes the subsequent segments of data using the adjusted encoding variables.

Alternatively, rate control module 52 may incrementally adjust encoding variables used by encoding module 48 to encode the subsequent segments of data until the encoder module 40 reaches a desired encoding result, e.g., a desired rate or quality. For an encoder that encodes at a constant quality, rate control module 52 may gradually increase the encoding variables until a target quality is achieved. To this end, rate control module 52 may increment the encoding variable an increment value when no resize requests are received for a particular period of time. For example, rate control module 52 may increment the encoding variable by the increment value for every superframe in which no resize request is received. If a resize request is received for one of the subsequent segments of data, however, encoder module 18 may again adjust the encoding variables used to encode the subsequent segments and begin incrementally adjusting the encoding variables. Incrementally adjusting the bit rate or other encoding variable to achieve a desired encoding result avoids abrupt quality changes in flow from one superframe to another superframe, thus enhancing the end users visual experience.

The components in encoder module 40 are exemplary of those applicable to implement the techniques described herein. Encoder module 40, however, may include many other components, if desired. The components in encoder module 40 may be implemented as one or more processors, digital signal processors, ASICs, FPGAs, discrete logic, software, hardware, firmware, or any combinations thereof. Moreover, encoder module 40 may comply with a multimedia coding standard such as MPEG-4, ITU-T H.263, ITU-T H.264, or another coding standard. Depiction of different features as modules is intended to highlight different functional aspects of encoder module 40 and does not necessarily imply that such modules must be realized by separate hardware or software components. Rather, functionality associated with one or more modules may be integrated within common or separate hardware or software components. Thus, the disclosure should not be limited to the example of encoder module 40.

Figure 4:
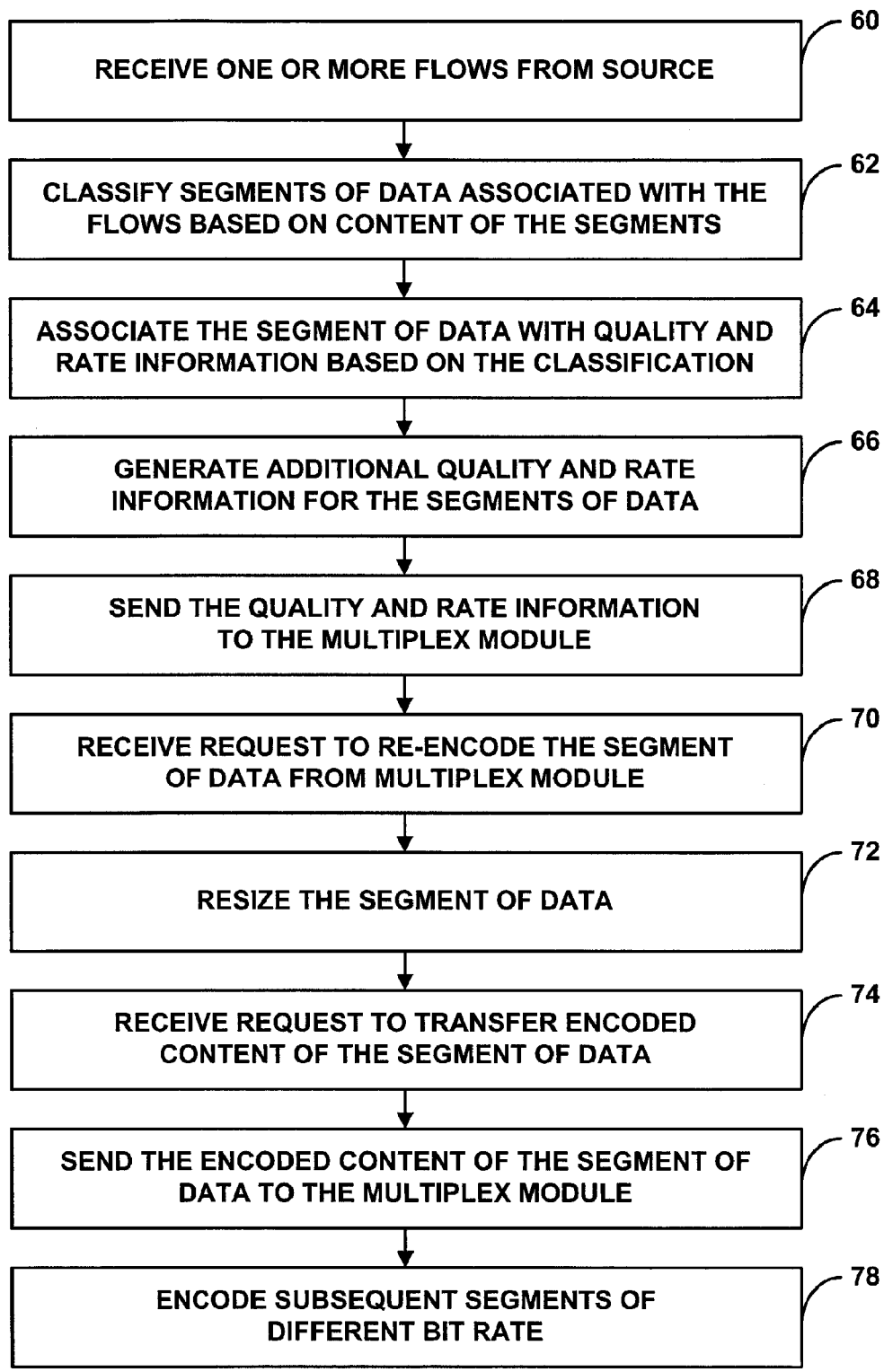
FIG. 4 is a flow diagram illustrating exemplary operation of an encoder module encoding multimedia data in accordance with the techniques of this disclosure.

FIG. 4 is a flow diagram illustrating exemplary operation of an encoder module, such as encoder module 40 of FIG. 3, encoding multimedia data in accordance with the techniques of this disclosure. Encoder module 40 receives one or more flows of multimedia data from a source (60). Encoder module 40 may, for example, receive the flows of multimedia data from a memory or an image capture device coupled to encoder module 40. The flows of multimedia data may comprise live real-time content, non real-time content, or a combination of real-time content and non real-time content.

Encoder module 40 classifies the segments of data based on their content (62). Content classification module 44 (FIG. 3) may, for example, classify the received segments of data based on the complexity (e.g., spatial complexity and/or temporal complexity) of the data of the segment. Content classification module 44 further associates the segments of data with quality and rate information based on the classification (64). As an example, content classification module 44 may associate the segments of data with one of a plurality of quality-rate curves. As described above, the quality-rate curves may be pre-computed and stored in a memory. As another example, content classification module 44 may associate the segments of data with one of a plurality of pre-computed quality-rate tables.

Encoder module 40 may generate additional quality and rate information for the segments of data (66). For example, quality and rate information generation module 46 may generate quality-rate tables for each of the segments of data. As describe above, the quality-rate tables indicate one or more quality levels associated with the segments of data and sizes of the segment of data at each of the quality levels.

Encoder module 40 sends the quality and rate information associated with the segment of data to a multiplex module 20 (68). Encoder module 40 may, for example, send the quality and rate information associated with the segment of data in response to a request from the multiplex module. Encoder module 40 may, for example, send a quality-rate curve and/or a quality-rate table associated with the segment of data. As described in detail above, the multiplex module uses the quality and rate information to monitor the size of a current superframe and to assist the multiplex module in determining which of the segments of data need to be resized.

If any of the segments of data associated with encoder module 40 need to be resized, encoder module 40 receives a resize request from the multiplex module 20 (70). The resize request from the multiplex module 20 may include a reduced bit rate or maximum size, e.g., in bits, for the segment of data. In response to the resize request, resizing module 50 resizes the encoded segment of data to reduce the size of the segment of data (72). For example, resizing module 50 may adjust one or more encoding variables to reduce the size of the segment of data. Resizing module 50 may, for example, re-encode the segment of data at a reduced bit rate specified by rate control module 52. Rate control module 52 may identify a reduced bit rate included within the resize request or determine the reduced bit rate on its own. Alternatively or additionally, resizing module 50 may re-encode the segment of data using an adjusted, e.g., higher, quantization parameter to reduce the size of the segment of data. Moreover, resizing module 50 may adjust the amount of information to be encoded. For example, resizing module 50 may reduce the number of bits used for encoding motion information by merging one or more motion vectors to reduce the size of the segment of data.

Encoder module 40 receives a request from the multiplex module 20 to send the encoded content of the segments of data to be included within the current superframe (74). In response to the request from the multiplex module, encoder module 2600 sends the encoded content of the segment of data to multiplex module 20 (76). As described above, encoder module 40 sends segments of data that were not selected for resizing at the original size and sends segments of data that were selected for resizing at the reduced size.

Encoder module 40 encodes one or more subsequent segments of data using adjusted encoding variables that result in the subsequent segments of data being encoded at a different bit rate than the bit rate at which the subsequent segment of data would have been encoded at had there been no re-encode request received for the previous segment of data (78). Using bit rate as an example, rate control module 52 may set a bit rate of encoding module 48 to the bit rate used to re-encode the selected segment of data, i.e., to the reduced bit rate. In one aspect of this disclosure, encoding module 48 may continue to encode subsequent segments of data at the reduced bit rate for a period of time and then change the bit rate to a bit rate sufficient to encode the segments of data at or above the target quality level. Alternatively, rate control module 52 may gradually increase the bit rate at which encoding module 48 encodes the subsequent segments of data until the bit rate reaches a bit rate sufficient to achieve or exceed the target quality. In either case, if a resize request is received for one of the subsequent segments of data, rate control module 52 may again reduce the bit rate for the subsequent segments and begin the process all over again. Although described in terms of adjusting the bit rate, encoding module 48 may adjust other encoding variables such as a QP used for encoding, a frame rate, a quality and the like.

Figure 5:
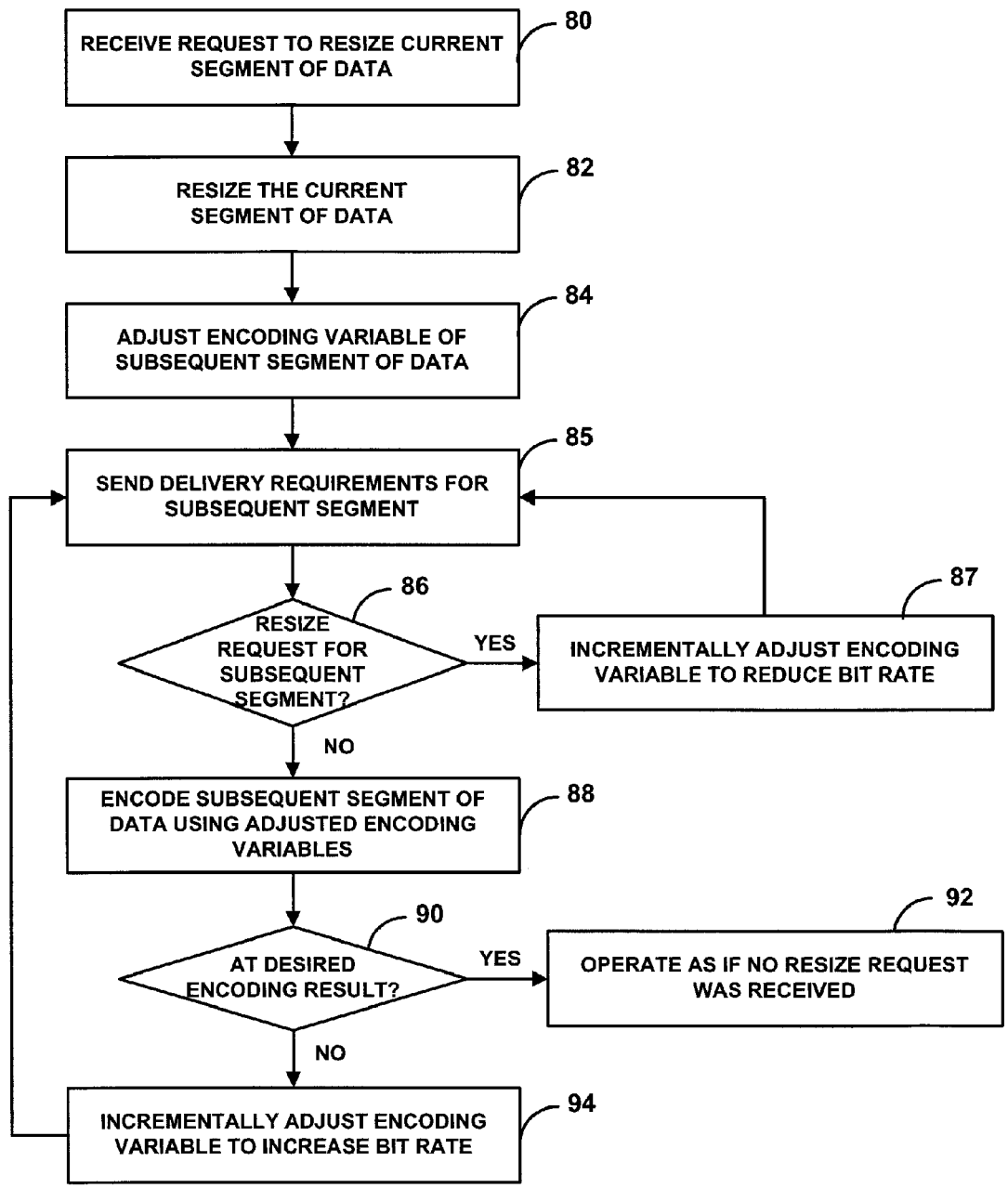
FIG. 5 is a flow diagram illustrating exemplary operation of an encoder module adjusting encoding variables in response to a resize request.

FIG. 5 is a flow diagram illustrating exemplary operation of an encoder module, such as encoder module 40 (FIG. 3), adjusting encoding variables in response to a resize request. Initially, resizing module 50 receives a resize request from multiplex module 20 (FIG. 1) directing resizing module 50 to resize the segment of data that encoder module 40 desires to send in the current superframe (80). In response to the request from multiplex module 20, resizing module 50 resizes the current segment of data (82). As described above, resizing module 50 may resize the segment of data by adjusting one or more encoding variables to reduce the bit rate of the segment of data to a bit rate specified by rate control module 52. For example, rate control module 52 may adjust one or more encoding variables to to resize the segment of data at a bit rate specified within the resize request. Alternatively, rate control module 52 may determine a reduced bit rate at which to resize the segment of data based on a maximum size specified in the resize request.

After resizing of the current segment of data, rate control module 52 adjusts one or more encoding variables used to encode one or more subsequent segments of data such that the subsequent segments of data are encoded at a bit rate that is different than the bit rate at which the subsequent segments of data would have been encoded had there been no request to resize (84). For example, rate control module 52 may adjust the encoding variables to encode the subsequent segments of data at the bit rate used to re-encode the previous segment of data.

Encoder module 40 sends delivery requirements, e.g., quality and rate information, associated with a subsequent segment of data to multiplex module (85). Encoder module 40 determines whether a resize request for the subsequent segment of data is received from multiplex module 20 (86). If a resize request is received from multiplex module 20, rate control module 52 may incrementally adjust the encoding variables by a decrement value to reduce the bit rate (87). Decrementing the encoding variables bit rate by the decrement value returns the encoding variables to values that result in the subsequent segments of data being encoded at the highest bit rate that multiplex module 20 accepted without requesting a resizing. In another example, rate control module 52 may adjust the encoding variables to achieve a reduced bit rate specified in the resize request received for the subsequent segment of data instead of incrementally adjusting the encoding variables to reduce the bit rate.

If a resize request is not received for the subsequent segment of data, encoding module 48 encodes the subsequent segment of data using the adjusted encoding variables set by rate control module 52 (88). Rate control module 52 determines whether the subsequent segment of data is encoded at a desired encoding result (90). In other words, rate control module 52 determines whether the encoding using the encoding variables result in a bit rate that is sufficient to encode the subsequent segment of data at or above the desired encoding result, e.g., desired quality level, bit rate, QP value, frame rate or the like. If the subsequent segment of data is encoded at or above the desired encoding result, rate control module 52 begins to operate as if no resize request was received (92). In other words, rate control module 52 selects encoding variables necessary to encode the subsequent segments of data to achieve the desired encoding result. For example, rate control module 52 may analyze a quality-rate curve associated with the subsequent segment of data and select the bit rate that corresponds to the intersection of the target quality level and the associated quality-rate curve.

If the subsequent segment of data is not encoded to achieve the desired encoding result, rate control module 52 incrementally adjusts the encoding variable by an increment value to increase the bit rate (94). For example, rate control module may increase the frame rate by an increment value, decrease the QP by an increment value, or the like. Encoder module 40 continues to send delivery requirements, e.g., quality and rate information, for subsequent segments of data and increment the encoding variables of the subsequent segments of data until a resize request is received for one of the subsequent segments of data or the encoding variables result in a bit rate that is sufficient to achieve the desired encoding result. In this manner, rate control module 52 gradually increments the encoding variables from the reduce bit rate to a bit rate sufficient to achieve or exceed the target quality level to avoid abrupt quality changes in flow from one superframe to another superframe, thus enhancing the end users visual experience.

Figure 6:
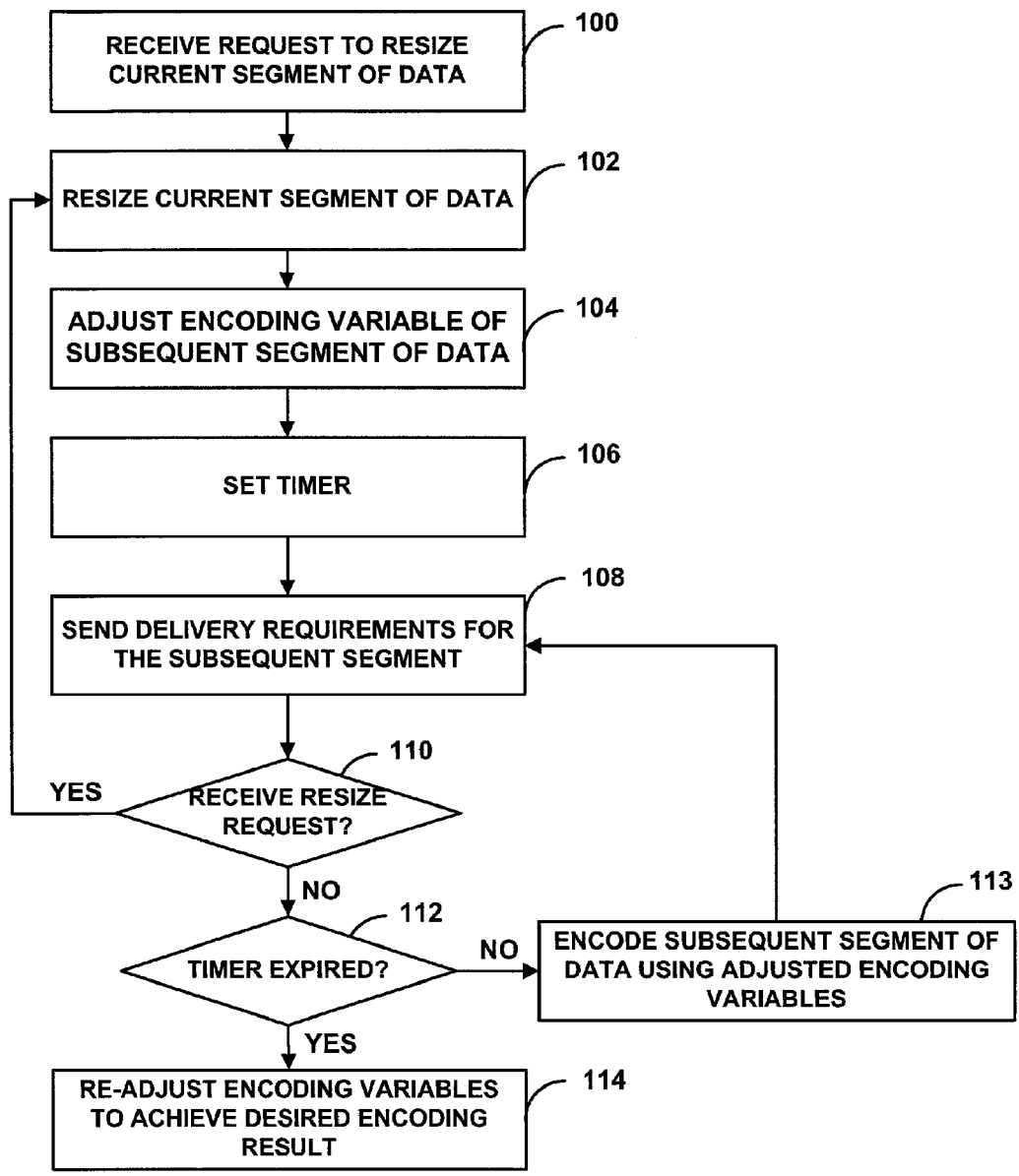
FIG. 6 is a flow diagram illustrating another exemplary operation of an encoder module adjusting encoding variables in response to a resize request.

FIG. 6 is a flow diagram illustrating another exemplary operation of an encoder module, such as encoder module 40 (FIG. 1), adjusting the encoding variables in response to a resize request. Initially, resizing module 50 receives a request from multiplex module 20 (FIG. 1) requesting resizing module 50 to resize the current segment of data (100). In response to the request from multiplex module 20, resizing module 50 resizes the current segment of data (102). As described above, resizing module 50 may resize the segment of data by adjusting one or more encoding variables to reduce the bit rate of the segment of data to a bit rate specified by rate control module 52.

After resizing the current segment of data, rate control module 52 adjusts one or more encoding variables adjusts one or more encoding variables used to encode one or more subsequent segments of data such that the subsequent segments of data are encoded at a bit rate that is different than the bit rate at which the subsequent segments of data would have been encoded had there been no request to resize (104). For example, rate control module 52 may adjust a QP or frame rate to adjust the bit rate at which encoding module 48 encodes subsequent segments of data. Rate control module 52 sets a timer that tracks an amount of time that has elapsed since receiving a resize request for one of the previous segments of data (106). The timer may, for example, be set to three seconds and count down. Alternatively, the rate control module 52 may use a counter instead of a timer, and track the number of subsequent segments of data that are transferred to multiplex module 20 without receiving a resize request.

Encoder module 40 sends delivery requirements, such as quality and rate information, associated with a subsequent segment of data to multiplex module 20 (108). Encoder module 40 determines whether a resize request for the subsequent segment of data is received from multiplex module 20 (110). If a resize request is received from multiplex module 20, rate control module 52 re-encodes the subsequent segment of data at the reduced bit rate and sets the bit rate at which encoding module 48 encodes subsequent segments of data equal to the reduced bit rate, i.e., the bit rate specified in the resize request. Moreover, rate control module 52 resets the timer.

If a resize request is not received for the subsequent segment of data, rate control module 52 determines whether the timer has expired (112). Alternatively, if rate control module maintains a counter that tracks the number of subsequent segments of data transferred without receiving a resize request, rate control module 52 may check to see whether the counter exceeds a threshold value. If the timer has expired (or the counter exceeds a threshold value), encoding module 48 encodes the subsequent segment of data using the adjusted encoding variables set by rate control module 52 (113). Encoder module 40 sends quality and rate information associated with the next subsequent segment of data to multiplex module 20 and determines whether a resize request for the next subsequent segment of data is received from multiplex module 20.

If the timer has expired (or the counter exceeds the threshold), rate control module 52 re-adjusts the encoding variables used to encode the subsequent segments of data such that the subsequent segments of data are encoded to achieve a desired encoding result. (114). For example, rate control module 52 re-adjust the encoding variables to achieve a desired target quality or a desired target bit rate. In this manner, encoding module 48 may continue to encode subsequent segments of data at the reduced bit rate for a period of time and then change to the bit rate necessary to encode the segments of data at or above the target quality level.

Based on the teachings described herein, one skilled in the art should appreciate that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other tangible medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

A computer program product, as disclosed herein, includes a computer-readable medium as well as any materials associated with the computer-readable medium, including packaging materials within which the computer-readable medium is packaged. The code associated with a computer-readable medium of a computer program product may be executed by a computer, e.g., by one or more processors, such as one or more digital signal processors (DSPs), general purpose microprocessors, ASICs, FPGAs, or other equivalent integrated or discrete logic circuitry. In some aspects, the functionality described herein may be provided within dedicated software modules or hardware modules configured for encoding and decoding, or incorporated in a combined CODEC.

Various aspects have been described. These and other aspects are within the scope of the following claims.

What is claimed is:

1. A method for encoding a stream of digital multimedia data, the method comprising:
    calculating a plurality of quality-rate characteristics for streams of data with varying content using a logarithmic function that is based on a quality metric and a bit rate;
    classifying a segment of data of the stream based on content included in the segment of data;
    associating the segment of data of the stream with one of the plurality of quality-rate characteristics based on the classification; and
    adjusting at least one encoding variable with respect to one of the plurality of quality-rate characteristics associated with a segment of data selected for resizing in order to encode one or more subsequent segments of data using the adjusted encoding variable.

2. The method of claim 1, wherein adjusting the at least one encoding variable comprises adjusting the encoding variable such that the subsequent segments of data are encoded at a desired encoding result.

3. The method of claim 1, wherein adjusting the at least one encoding variable comprises adjusting the encoding variable such that the subsequent segments of data are encoded at a desired quality level.

4. The method of claim 1, wherein adjusting the at least one encoding variable comprises adjusting the encoding variable such that the subsequent segments of data are encoded at a desired bit rate.

5. The method of claim 1, wherein adjusting the at least one encoding variable comprises adjusting the encoding variable such that the subsequent segments of data are encoded at a desired frame rate.

6. The method of claim 1, wherein adjusting the at least one encoding variable comprises adjusting the encoding variable such that the subsequent segments of data are encoded at a desired quantization parameter (QP).

7. The method of claim 1, wherein adjusting the at least one encoding variable comprises adjusting the encoding variable when no resize requests are received for a period of time.

8. The method of claim 1, wherein adjusting the encoding variable comprises incrementally adjusting the encoding variable used to encode the subsequent segments of data until the subsequent segments of data are encoded at a desired encoding result.

9. The method of claim 8, wherein incrementally adjusting the encoding variable comprises incrementally adjusting the encoding variable by an increment value when no resize request is received for the subsequent segment of data and the subsequent segment of data is not encoded at the desired encoding result.

10. The method of claim 8, further comprising:
    receiving a resize request for the subsequent segment of data; and
    adjusting the encoding variable used to encode the subsequent segment of data by a decrement value upon receiving the resize request for the subsequent segment of data.

11. The method of claim 8, further comprising:
    receiving a resize request for the subsequent segment of data; and
    adjusting the encoding variable to achieve a reduced bit rate specified in the resize request received for the subsequent segment of data.

12. The method of claim 1, wherein adjusting the encoding variable to be used to encode one or more subsequent segments of data comprises setting the encoding variable to be used to encode one or more subsequent segments of data equal to the encoding variable used to resize the segment of data.

13. The method of claim 1, wherein adjusting the encoding variable used to encode one or more subsequent segments of data comprises adjusting the encoding variable used to encode one or more subsequent segments of data upon receiving resize requests for a number of consecutive segments of data.

14. The method of claim 1, wherein the segments of data comprise segments of real-time data.

15. An apparatus for encoding a stream of digital multimedia data, the apparatus comprising:
    a memory configured to store instructions that cause the apparatus to:
        calculate a plurality of quality-rate characteristics for streams of data with varying content using a logarithmic function that is based on a quality metric and a bit rate;
        classify a segment of data of the stream based on content included in the segment of data;
        associate the segment of data of the stream with one of the plurality of quality-rate characteristics based on the classification; and
        adjust at least one encoding variable with respect to one of the plurality of quality-rate characteristics associated with a segment of data selected for resizing in order to encode one or more subsequent segments of data using the adjusted encoding variable; and
    a processor configured to execute the instructions.

16. The apparatus of claim 15, wherein the memory stores further instructions that cause the apparatus to adjust the encoding variable used to encode the subsequent segments of data such that the subsequent segments of data are encoded at a desired encoding result.

17. The apparatus of claim 15, wherein the memory stores further instructions that cause the apparatus to adjust the encoding variable used to encode the subsequent segments of data such that the subsequent segments of data are encoded at a desired quality level.

18. The apparatus of claim 15, wherein the memory stores further instructions that cause the apparatus to adjust the encoding variable used to encode the subsequent segments of data such that the subsequent segments of data are encoded at a desired bit rate.

19. The apparatus of claim 15, wherein the memory stores further instructions that cause the apparatus to adjust the encoding variable used to encode the subsequent segments of data such that the subsequent segments of data are encoded at a desired frame rate.

20. The apparatus of claim 15, wherein the memory stores further instructions that cause the apparatus to adjust the encoding variable used to encode the subsequent segments of data such that the subsequent segments of data are encoded at a desired quantization parameter (QP).

21. The apparatus of claim 15, wherein the memory stores further instructions that cause the apparatus to adjust the encoding variable used to encode the subsequent segments of data when no resize requests are received for a period of time.

22. The apparatus of claim 15, wherein the memory stores further instructions that cause the apparatus to incrementally adjust the encoding variable used to encode the subsequent segments of data until the subsequent segments of data are encoded at a desired encoding result.

23. The apparatus of claim 22, wherein the memory stores further instructions that cause the apparatus to incrementally adjust the encoding variable by an increment value when no resize request is received for the subsequent segment of data and the subsequent segment of data is not encoded at the desired encoding result.

24. The apparatus of claim 22, wherein the memory stores further instructions that cause the apparatus to:
receive a resize request for the subsequent segment of data, and
adjust the encoding variable used to encode the subsequent segment of data by a decrement value upon receiving the resize request for the subsequent segment of data.

25. The apparatus of claim 22, wherein the memory stores further instructions that cause the apparatus to:
receive a resize request for the subsequent segment of data, and
adjust the encoding variable to achieve a reduced bit rate specified in the resize request received for the subsequent segment of data.

26. The apparatus of claim 15, wherein the memory stores further instructions that cause the apparatus to set the encoding variable to be used to encode one or more subsequent segments of data equal to the encoding variable used to resize the segment of data.

27. The apparatus of claim 15, wherein the memory stores further instructions that cause the apparatus to adjust the encoding variable used to encode one or more subsequent segments of data upon receiving resize requests for a number of consecutive segments of data.

28. The apparatus of claim 15, wherein the segments of data comprise segments of real-time data.

29. An apparatus for encoding a stream of digital multimedia data, the apparatus comprising:
means for generating a plurality of quality-rate characteristics for streams of data with varying content using a logarithmic function that is based on a quality metric and a bit;
means for classifying a segment of data of the stream based on content included in the segment of data;
means for associating the segment of data of the stream with one of the plurality of quality-rate characteristics based on the classification; and
means for adjusting at least one encoding variable with respect to one of the plurality of quality-rate characteristics associated with a segment of data selected for resizing in order to encode one or more subsequent segments of data using the adjusted encoding variable.

30. The apparatus of claim 29, wherein the adjusting means comprises means for adjusting the encoding variable used to encode the subsequent segments of data such that the subsequent segments of data are encoded at a desired encoding result.

31. The apparatus of claim 29, wherein the adjusting means comprises means for adjusting the encoding variable used to encode the subsequent segments of data such that the subsequent segments of data are encoded at a desired quality level.

32. The apparatus of claim 29, wherein the adjusting means comprises means for adjusting the encoding variable used to encode the subsequent segments of data such that the subsequent segments of data are encoded at a desired bit rate.

33. The apparatus of claim 29, wherein the adjusting means comprises means for adjusting the encoding variable used to encode the subsequent segments of data such that the subsequent segments of data are encoded at a desired frame rate.

34. The apparatus of claim 29, wherein the adjusting means comprises means for adjusting the encoding variable used to encode the subsequent segments of data such that the subsequent segments of data are encoded at a desired quantization parameter (QP).

35. The apparatus of claim 29, wherein the adjusting means comprises means for adjusting the encoding variable used to encode the subsequent segments of data when no resize requests are received for a period of time.

36. The apparatus of claim 29, wherein the adjusting means comprises means for incrementally adjusting the encoding variable used to encode the subsequent segments of data until the subsequent segments of data are encoded at a desired encoding result.

37. The apparatus of claim 36, wherein the adjusting means comprises means for incrementally adjusting the encoding variable by an increment value when no resize request is received for the subsequent segment of data and the subsequent segment of data is not encoded at the desired encoding result.

38. The apparatus of claim 36, further comprising wherein:
receiving means for receiving a resize request for the subsequent segment of data; and,
wherein the adjusting means comprises means for adjusting the encoding variable used to encode the subsequent segment of data by a decrement value upon receiving the resize request for the subsequent segment of data.

39. The apparatus of claim 36, further comprising:
receiving means for receiving a resize request for the subsequent segment of data,
wherein the adjusting means comprises means for adjusting the encoding variable to achieve a reduced bit rate specified in the resize request received for the subsequent segment of data.

40. The apparatus of claim 29, wherein the adjusting means comprises means for setting the encoding variable to be used to encode one or more subsequent segments of data equal to the encoding variable used to resize the segment of data.

41. The apparatus of claim 29, wherein the adjusting means comprises means for adjusting the encoding variable used to encode one or more subsequent segments of data upon receiving resize requests for a number of consecutive segments of data.

42. The apparatus of claim 29, wherein the segments of data comprise segments of real-time data.

43. A multimedia encoding device for processing digital video data, comprising:
an encoder module configured to:
generate a plurality of quality-rate characteristics for streams of data with varying content using a logarithmic function that is based on a quality metric and a bit;
classify a segment of data of the stream based on content included in the segment of data;
associate the segment of data of the stream with one of the plurality of quality-rate characteristics based on the classification; and
adjust at least one encoding variable with respect to one of the plurality of quality-rate characteristics associated with a segment of data selected for resizing in order to encode one or more subsequent segments of data using the adjusted encoding variable.

44. The processor of claim 43, wherein the encoder module is further configured to adjust the encoding variable such that the subsequent segments of data are encoded at a desired encoding result.

45. The processor of claim 43, wherein the encoder module is further configured to adjust the encoding variable such that the subsequent segments of data are encoded at a desired quality level.

46. The processor of claim 43, wherein the encoder module is further configured to adjust the encoding variable such that the subsequent segments of data are encoded at a desired bit rate.

47. The processor of claim 43, wherein the encoder module is further configured to adjust the encoding variable such that the subsequent segments of data are encoded at a desired frame rate.

48. The processor of claim 43, wherein the encoder module is further configured to adjust the encoding variable such that the subsequent segments of data are encoded at a desired quantization parameter (QP).

49. The processor of claim 43, wherein the encoder module is further configured to adjust the encoding variable when no resize requests are received for a period of time.

50. The processor of claim 43, wherein the encoder module is further configured to incrementally adjust the encoding variable used to encode the subsequent segments of data until the subsequent segments of data are encoded at a desired encoding result.

51. The processor of claim 50, wherein the encoder module is further configured to incrementally adjust the encoding variable by an increment value when no resize request is received for the subsequent segment of data and the subsequent segment of data is not encoded at the desired encoding result.

52. The processor of claim 50, wherein the encoder module is further configured to:
receive a resize request for the subsequent segment of data; and
adjust the encoding variable used to encode the subsequent segment of data by a decrement value upon receiving the resize request for the subsequent segment of data.

53. The processor of claim 50, wherein the encoder module is further configured to:
receive a resize request for the subsequent segment of data; and
adjust the encoding variable to achieve a reduced bit rate specified in the resize request received for the subsequent segment of data.

54. The processor of claim 43, wherein the encoder module is further configured to set the encoding variable to be used to encode one or more subsequent segments of data equal to the encoding variable used to resize the segment of data.

55. The processor of claim 43, wherein the encoder module is further configured to adjust the encoding variable used to encode one or more subsequent segments of data upon receiving resize requests for a number of consecutive segments of data.

56. A computer-program product for processing digital video data comprising:
a non-transitory computer readable medium comprising instructions to cause at least one computer to:
generate a plurality of quality-rate characteristics for streams of data with varying content using a logarithmic function that is based on a quality metric and a bit rate;
classify a segment of data of the stream based on content included in the segment of data;
associate the segment of data of the stream with one of the plurality of quality-rate characteristics based on the classification; and
adjust at least one encoding variable with respect to one of the plurality of quality-rate characteristics associated with a segment of data selected for resizing in order to encode one or more subsequent segments of data using the adjusted encoding variable.

57. The computer-program product of claim 56, wherein the non-transitory computer readable medium further comprises instructions that cause the computer to adjust the encoding variable used to encode the subsequent segments of data such that the subsequent segments of data are encoded at a desired encoding result.

58. The computer-program product of claim 57, wherein the instructions to cause the computer to adjust the encoding variable comprise instructions to cause the computer to adjust the encoding variable used to encode the subsequent segments of data such that the subsequent segments of data are encoded at a desired quality level.

59. The computer-program product of claim 57, wherein the instructions to cause the computer to adjust the encoding variable comprise instructions to cause the computer to adjust the encoding variable used to encode the subsequent segments of data such that the subsequent segments of data are encoded at a desired bit rate.

60. The computer-program product of claim 57, wherein the instructions to cause the computer to adjust the encoding variable comprise instructions to cause the computer to adjust the encoding variable used to encode the subsequent segments of data such that the subsequent segments of data are encoded at a desired frame rate.

61. The computer-program product of claim 57, wherein the instructions to cause the computer to adjust the encoding variable comprise instructions to cause the computer to adjust the encoding variable used to encode the subsequent segments of data such that the subsequent segments of data are encoded at a desired quantization parameter (QP).

62. The computer-program product of claim 57, wherein the instructions to cause the computer to adjust the encoding variable comprise instructions to cause the computer to adjust the encoding variable used to encode the subsequent segments of data when no resize requests are received for a period of time.

63. The computer-program product of claim 57, wherein the instructions to cause the computer to adjust the encoding variable comprise instructions to cause the computer to incrementally adjust the encoding variable used to encode the subsequent segments of data until the subsequent segments of data are encoded at a desired encoding result.

64. The computer-program product of claim 63, wherein the instructions to cause the computer to incrementally adjust the encoding variable comprise instructions to cause the computer to incrementally adjust the encoding variable by an increment value when no resize request is received for the subsequent segment of data and the subsequent segment of data is not encoded at the desired encoding result.

65. The computer-program product of claim 63, wherein the non-transitory computer readable medium further comprises instructions to cause the computer to:
  receive a resize request for the subsequent segment of data; and
  adjust the encoding variable used to encode the subsequent segment of data by a decrement value upon receiving the resize request for the subsequent segment of data.

66. The computer-program product of claim 63, wherein the non-transitory computer readable medium further comprises instructions to cause the computer to:
  receive a resize request for the subsequent segment of data; and
  adjust the encoding variable to achieve a reduced bit rate specified in the resize request received for the subsequent segment of data.

67. The computer-program product of claim 56, wherein the instructions to cause the computer to adjust the encoding variable to be used to encode one or more subsequent segments of data comprise instructions to cause the computer to set the encoding variable to be used to encode one or more subsequent segments of data equal to the encoding variable used to resize the segment of data.

68. The computer-program product of claim 56, wherein instructions to cause the computer to adjust the encoding variable used to encode one or more subsequent segments of data comprise instructions to cause the computer to adjust the encoding variable used to encode one or more subsequent segments of data upon receiving resize requests for a number of consecutive segments of data.

69. The method of claim 1, wherein the logarithmic function comprises $Q=a*\ln(r)+b$, wherein Q is the quality metric, a and b are constants, and r is the bit rate.

70. The method of claim 1, further comprising:
  calculating a normalized quality level for a class of content;
  calculating a quality adjustment offset based on the normalized quality level; and
  adjusting at least one quality-rate characteristic based on the calculated quality adjustment offset.

71. The apparatus of claim 15, wherein the logarithmic function comprises $Q=a*\ln(r)+b$, wherein Q is the quality metric, a and b are constants, and r is the bit rate.

72. The apparatus of claim 16, wherein the memory stores further instructions that cause the apparatus to calculate a normalized quality level for a class of content and a quality adjustment offset based on the normalized quality level, and adjust at least one quality-rate characteristic based on the calculated quality adjustment offset.

73. The apparatus of claim 29, wherein the logarithmic function comprises $Q=a*\ln(r)+b$, wherein Q is the quality metric, a and b are constants, and r is the bit rate.

74. The apparatus of claim 29, further comprising:
  means for calculating a normalized quality level for a class of content and a quality adjustment offset based on the calculated normalized quality level; and
  means for adjusting at least one quality-rate characteristic based on the calculated quality adjustment offset.

75. The computer-program product of claim 56, wherein the logarithmic function comprises $Q=a*\ln(r)+b$, wherein Q is the quality metric, a and b are constants, and r is the bit rate.

76. The computer-program product of claim 56, further comprising instructions to cause the computer to:
  calculate a normalized quality level for a class of content and a quality adjustment offset based on the calculated normalized quality level; and
  adjust at least one quality-rate characteristic based on the calculated quality adjustment offset.

* * * * *